United States Patent [19]

Savit

[11] Patent Number: 4,686,654

[45] Date of Patent: Aug. 11, 1987

[54] METHOD FOR GENERATING ORTHOGONAL SWEEP SIGNALS

[75] Inventor: Carl H. Savit, Houston, Tex.

[73] Assignee: Western Geophysical Company of America, Houston, Tex.

[21] Appl. No.: 891,475

[22] Filed: Jul. 31, 1986

[51] Int. Cl.[4] ............................................. G01V 1/22
[52] U.S. Cl. ...................................... 367/41; 367/189
[58] Field of Search ..................................... 367/38–42, 367/189, 190; 364/421, 422; 342/201, 132; 380/33–36; 370/19, 21, 22

[56] References Cited

U.S. PATENT DOCUMENTS

| 3,264,606 | 8/1966 | Crook et al. | 367/39 |
| 3,326,320 | 6/1967 | Forester | 367/41 |
| 3,811,111 | 5/1974 | Barbier et al. | 367/40 |
| 3,956,730 | 5/1976 | Barbier | 367/37 |
| 4,011,924 | 3/1977 | Barbier | 367/39 X |
| 4,168,485 | 9/1979 | Payton et al. | 367/41 |
| 4,204,278 | 5/1980 | Nelson | 367/39 |
| 4,545,039 | 10/1985 | Savit | 367/39 |

OTHER PUBLICATIONS

Goupillaud, Signal Design in the "Vibroseis" Technique, Geophysics, vol. 41, No. 6, pp. 1291–1304, Dec. 1976.
Cunningham, Some Alternative Vibrator Signals, Geophysics, vol. 44, No. 12, pp. 1901–1921, Dec. 1979.
Sosie, A New Science Method, 40th Annual International SEG Meeting (11/12/70), Barbier, pp. 1–23.

Primary Examiner—Deborah L. Kyle
Assistant Examiner—John E. Griffiths
Attorney, Agent, or Firm—William A. Knox; Barry C. Kane; Robert E. Lowe

[57] ABSTRACT

A first sweep signal consists of a plurality of waveforms having non-invariant fundamental periods exhibiting a monotonic frequency progression of at least one octave over the duration of the sweep. Each waveform may consist of an ordered set of asymmetrical pulses distributed within the period of the waveform in a prescribed sequence as a function of time. A second sweep signal is orthogonalized with respect to the first by time-reversing the distribution-sequence of the pulse set.

4 Claims, 4 Drawing Figures

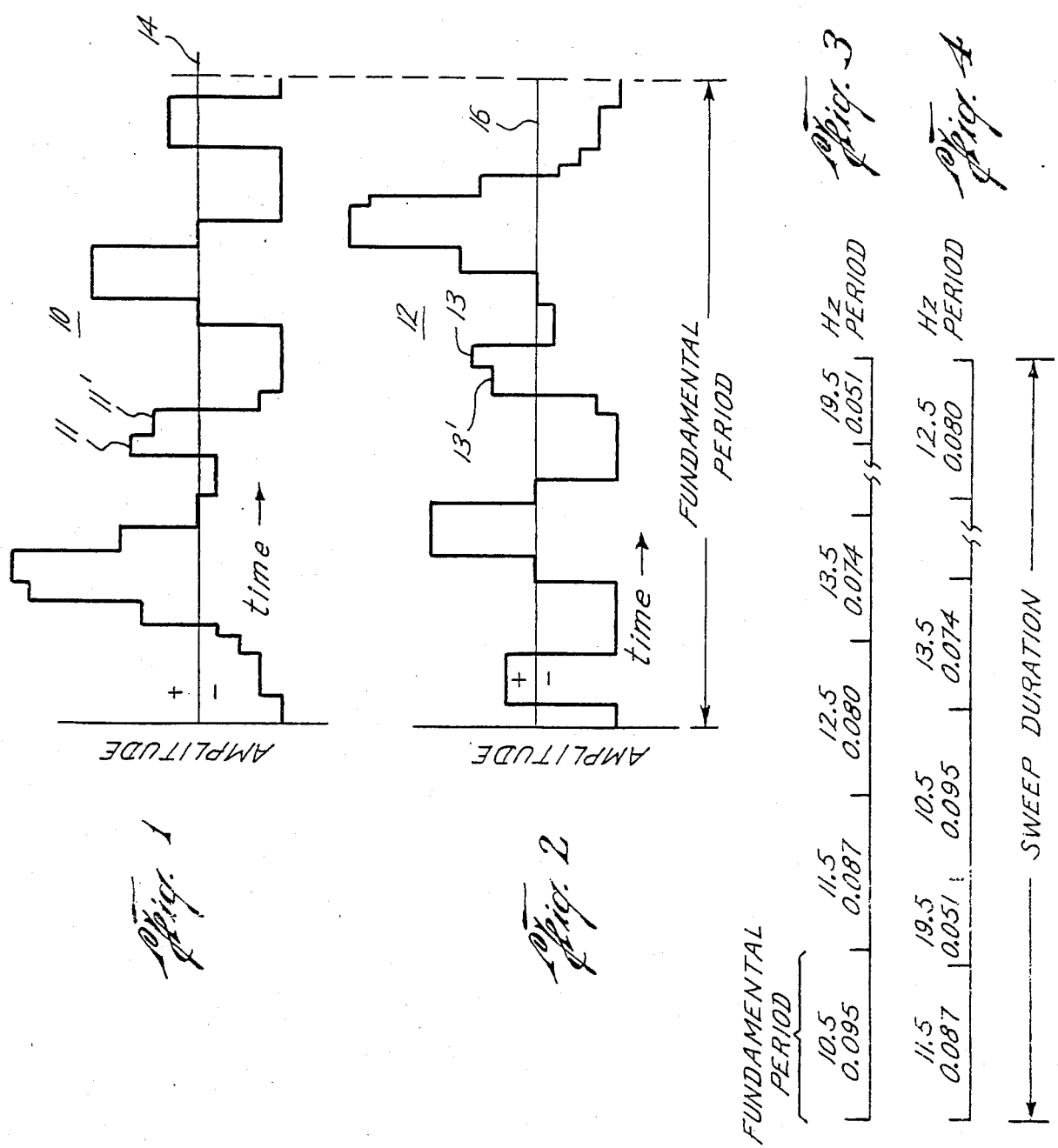

METHOD FOR GENERATING ORTHOGONAL SWEEP SIGNALS

BACKGROUND OF THE INVENTION

1. Field of the Invention

This is a method for uniquely encoding each of a plurality of swept-frequency signals such that the cross correlation function between any two signals is minimal.

2. Discussion of the Prior Art

A useful method for seismic exploration involves injection into the earth of a chirp- or swept-frequency signal that has a duration of from about six to about fifteen seconds. Classically, the swept-frequency signal is monotonic. Monotonic means that the frequency of the signal varies continuously over the duration of the sweep and no frequency is repeated. A typical frequency range might be 10–80 Hz (cycles per second), a frequency range of three octaves. An octave is a 2:1 change in frequency, e.g. 10–20 Hz. In practice, the injected swept-frequency signal propagates into the earth (land or marine environments), is reflected from subsurface earth layers and returns to the surface where the reflected signal is received by suitable strings of seismic sensors and is recorded for future processing. The recorded, reflected signal is then cross-correlated with a replica of the original swept-frequency signal to produce a seismogram. See, for example, D. L. Goupillaud, "Signal design in the vibroseis technique", Geophysics v 41, n. 6, pp 1291–1304.

David Nelson, U.S. Pat. No. 4,204,278, dated 05/20/80 teaches a quasi-periodic pulse train that is generated and swept over a repetition frequency of but a single octave. The pulsed wave train is so designed that the odd harmonics of the fundamental repetition frequency are suppressed but the even harmonics are preferentially augmented. By that method, Nelson achieves an effective swept-frequency range of several octaves from a single-octave original signal. The Nelson patent is incorporated herein by reference to the extent that it teaches a method of generating a quasi-periodic pulse train having a fundamental repetition frequency.

The result of a cross-correlation process is a cross-correlation function having a central maximum surrounded by a plurality of lesser-amplitude side lobes. It is known that the side lobes can be suppressed by randomizing the input sweep such as by adding white noise or by scrambling the sequence of the periodic signal elements. See for exmple U.S. Pat. No. 4,545,039, issued 10/01/85 to C. H. Savit, which is incorporated herein by reference, and copending patent application No. 416,582 by the same inventor, both of which are assigned to the assignee of this invention.

A secondary benefit to be derived from randomization of sweep signals, which may be likened to a unique coding scheme, is this: If two or more exploration crews are working in substantially the same geographic area and if the respective crews are using sweeps having substantially the same characteristics, then, mutual signal interference is likely to occur that may invalidate the cross-correlation process. Such interference can be minimized if each crew uses differently randomized signals that are orthogonal to one another. Orthogonality means that a cross-correlation function derived from cross-correlating the orthogonal signals is a minimum. However, although perfect orthogonality can be approached, (a zero correlation function), it can never be fully achieved.

A particularly interesting use for differently-randomized sweeps is in a two-boat marine seismic exploration operation wherein three seismic lines of profile can be surveyed for the price of only two seismic boats operating in parallel (use of three boats could provide data for five lines of profile). Each boat employs a uniquely encoded, randomized sweep for generating seismic reflection data. Boat A transmits sweep signal A which provides seismic reflection data from beneath the boat, which boat A itself receives, and seismic data from a line halfway between boats A and B, which may be received by boat B. Similarly, and concurrently with boat A, B transmits orthogonal sweep signal B which provides seismic reflection data to both boats B and A. Although each boat has recorded two overlapping sets of reflected seismic signals, those signals are easily sorted out by cross-correlation, using replicas of the A and B signals, because sweep signals A and B are orthogonal, even though they overlap in time. The same technique could, of course, be practiced on land.

SUMMARY OF THE INVENTION

It is an object of this invention to enhance the orthogonality, with respect to each other, of at least two swept-frequency signals, while retaining, in both signals, common amplitude and phase spectra.

In an aspect of this invention, there is provided a first swept-frequency signal consisting of a plurality of non-invariant waveforms or sets of pulses constituting a plurality of fundamental periods. Preferably, each fundamental period includes a set of asymmetrical pulses that are distributed as a function of time within that period. A second swept-frequency signal is provided that is orthogonalized with respect to the first signal, by time-reversing the pulse-set distribution contained within the corresponding fundamental periods of the first signal.

In another aspect of this invention, the fundamental periods contained within the total sweep signal form a monotonic sequence.

In another aspect of this invention, the fundamental periods contained within the total sweep signal form a time-randomized sequence within the duration of the sweep signal.

BRIEF DESCRIPTION OF THE DRAWINGS

The basic principles and benefits of this invention may be better understood by reference to the drawings, wherein:

FIG. 1 shows a set of pulses that constitute a fundamental period of a sweep signal;

FIG. 2 is a time-reversed version of FIG. 1;

FIG. 3 is representative of a one-octave sweep signal including a plurality of fundamental periods arranged as a monotonic sequence; and FIG. 4 is representative of a one-octave sweep signal wherein the fundamental periods are arranged in a time-randomized or scrambled sequence.

DETAILED DESCRIPTION OF THE PREFERRED EMBODIMENT

I have found that an additional enhancement to the orthogonality of two similar signals can be obtained by time-reversing each waveform that comprises a fundamental period of one such signal, with respect to the corresponding waveforms of the other signal. The method is applicable particularly to signals in which the fundamental waveforms consist of sets of pulses that are asymmetrical over the fundamental period of the waveform. That is to say, no signals in which the pulse set for a fundamental period is not invariant (or invariant except for sign) under time reversal. I have found that such time reversals do not alter the frequency characteristic of a sweep. The amplitude and phase spectra remain the same for the two sweep signals.

A particularly useful ordered pulse set 10, consisting of pulses such as 11 and 11' and comprising a fundamental time period (the period of a waveform in seconds in the time domain is the reciprocal of frequency) is typically shown in FIG. 4 of the Nelson patent, earlier discussed, and reproduced here as FIG. 1.

FIG. 2 represents the time reversal 12 of the pulse set including pulses such as 13, 13' of FIG. 1. It should be clear, from simple inspection of the Figures, that the correlation value of the signal 10 of FIG. 1 with itself is much greater than the correlation value of the signal 10 of FIG. 1 with the signal 12 of FIG. 2.

For illustrative purposes, there are shown zero reference lines 14 and 16 in FIGS. 1 and 2 respectively such that pulses above the line are positive (compressive) and pulses below the line are negative (rarefractive).

The correlation at zero time lag of either one of the pulse sets with itself (auto-correlation) is the integral (summation) of the squares of the pulse values over the fundamental period. On the other hand, the cross-correlation of pulse set 10 and its time-reversed sequence 12 at zero time lag is the integral of the positive and negative products over the same period. Hence, the cross-correlation value will be smaller in absolute value than is the auto-correlation.

An actual sweep, of course, consists of a plurality of fundamental periods swept over an octave within the duration of the sweep as shown in FIG. 3. The fundamental sweep periods (or their reciprocal, sweep frequency) may form a monotonic sequence. Alternatively, the fundamental sweep periods may be scrambled or time-randomized over the duration of the sweep as shown in FIG. 4. Observe that the individual pulses within a period are not shown for reasons of clarity.

For example, the fundamental periods for a one octave, 10-20 Hz monotonic sweep sequence of ten periods are, in seconds, measured at the center frequency for each period:

0.095, 0.087, 0.080, 0.074, . . . , 0.051

For a time-randomized or scrambled sweep sequence, the progression might be:

0.087, 0.051, 0.091, 0.074, . . . ,0.080 as suggested in the Savit '039 patent.

When time reversal of the pulse set constituting each of the fundamental periods of a sweep is applied as above described, the orthogonality of those signals will be enhanced because there will be no coincident values of the correlation products. That is, there will be no squared values instead of the one or more such values that occur at certain time lags as shown in the '039 patent or the copending '582 application. Additionally, neighboring fundamental periods of the integrated products (cross-correlation values) that are unavoidably high will be much less likely to produce high positice products with time reversals.

Those skilled in the art can readily adapt the apparatus and electronic circuitry, described in the referenced U.S. Pat. Nos. 4,204,278 and 4,545,039, for use in the practice of the method as claimed hereinafter. Utilization of the referenced apparatus therefore constitutes the best mode presently contemplated for practicing my invention.

Variations and modifications in the herein described method that fall within the scope of this invention will undoubtedly suggest themselves to those skilled in the art. It will be apparent to those skilled in the art that although this invention has been described in terms of pulse sets as taught by the Nelson patent, the principles of this invention may be applied to any ordered sequence of pulses. This invention is limited only by the appended claims.

I claim as my invention:

1. A method for enhancing the orthogonality, with respect to each other, of at least two swept-frequency signals, while retaining common amplitude and phase spectra, comprising the steps of:

providing a first swept-frequency signal including a plurality of time periods within the duration of said first swept-frequency signal, each said time period including a set of asymmetrical pulses distributed in a first sequence as a function of time; and providing at least a second swept-frequency signal including a plurality of time periods within the duration of said second swept-frequency signal that correspond to the time periods of said first signal, at least one of said time periods of said second swept-frequency signal including a set of asymmetrical pulses that are distributed as a function of time in a reverse sequence with respect to the pulse distribution within the corresponding fundamental period of said first swept-frequency signal.

2. The method of cliam 1 wherein the time periods included within the duration of said first and second swept-frequency signals form a monotonic sequence.

3. The method of claim 1 wherein the time periods included within the duration of said second swept-frequency signal form a time-randomized sequence with respect to the time periods included within the duration of said first swept-frequency signal.

4. A method for enhancing the orthogonality, with respect to each other, of at least two swept-frequency signals, while retaining common amplitude and phase spectra, comprising the steps of:

providing a first swept-frequency signal including a plurality of time periods within the duration of said first swept-frequency signal, each said time period including a set of asymmetrical pulses distributed in a first sequence as a function of time; and providing at least a second swept-frequency signal including a plurality of time periods within the duration of said second swept-frequency signal that correspond to the time periods of said first signal, each of said time periods of said second swept-frequency signal including a set of asymmetrical pulses that are distributed as a function of time in a reverse sequence with respect to the pulse distribution within the corresponding time periods of said first swept-frequency signal.

* * * * *